United States Patent [19]
Traylor

[11] Patent Number: 5,713,385
[45] Date of Patent: Feb. 3, 1998

[54] AIR GAP BODY FOR REVERSE OSMOSIS SYSTEM

[76] Inventor: Paul L. Traylor, 16591 Milliken Ave., Irvine, Calif. 92714

[21] Appl. No.: 751,886

[22] Filed: Nov. 18, 1996

[51] Int. Cl.⁶ .................. F16K 24/00; E03C 1/12
[52] U.S. Cl. .................... 137/216; 137/216.1
[58] Field of Search .................... 137/216, 216.1

[56] References Cited

U.S. PATENT DOCUMENTS

| | | |
|---|---|---|
| 2,878,826 | 3/1959 | Dolenga . |
| 3,183,923 | 5/1965 | Henrikson ............... 137/216 |
| 3,411,524 | 11/1968 | Raine et al. . |
| 3,620,241 | 11/1971 | Brown ............... 137/216 |
| 3,716,143 | 2/1973 | Clark . |
| 3,768,924 | 10/1973 | Huffman . |
| 3,856,672 | 12/1974 | Boswinkle et al. . |
| 3,929,149 | 12/1975 | Phillips . |
| 3,967,638 | 7/1976 | Tondreau ............... 137/216 |
| 4,071,445 | 1/1978 | Katayama et al. . |
| 4,134,419 | 1/1979 | Richetti ............... 137/216 |
| 4,454,891 | 6/1984 | Dreibelbis et al. . |
| 4,646,775 | 3/1987 | Traylor . |
| 4,771,485 | 9/1988 | Traylor . |
| 4,812,237 | 3/1989 | Cawley et al. . |
| 4,856,121 | 8/1989 | Traylor . |
| 4,917,847 | 4/1990 | Solomon . |
| 4,944,877 | 7/1990 | Maples . |
| 4,967,784 | 11/1990 | Barhydt, Sr. et al. . |
| 5,006,234 | 4/1991 | Menon et al. . |
| 5,176,165 | 1/1993 | Traylor . |
| 5,305,778 | 4/1994 | Traylor . |

Primary Examiner—Gerald A. Michalsky
Attorney, Agent, or Firm—J. F. McLellan

[57] ABSTRACT

A method and apparatus for modifying or retrofitting an air gap arrangement for venting the discharge from an existing waste water source such as a household dishwasher, so that the arrangement will also vent the waste water discharge from a reverse osmosis system.

21 Claims, 4 Drawing Sheets

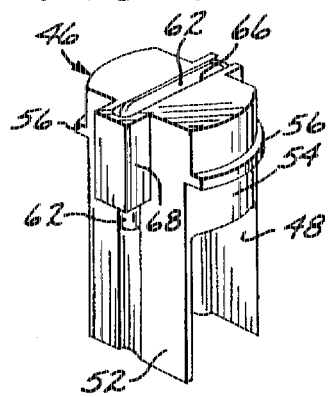
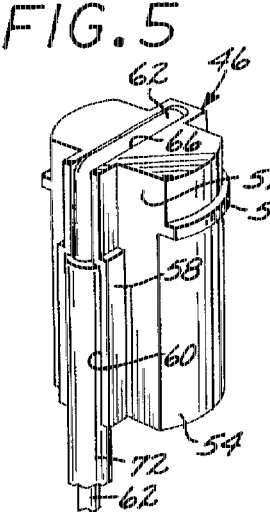
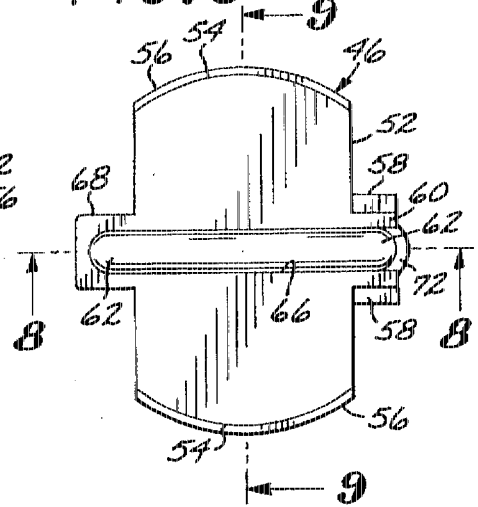
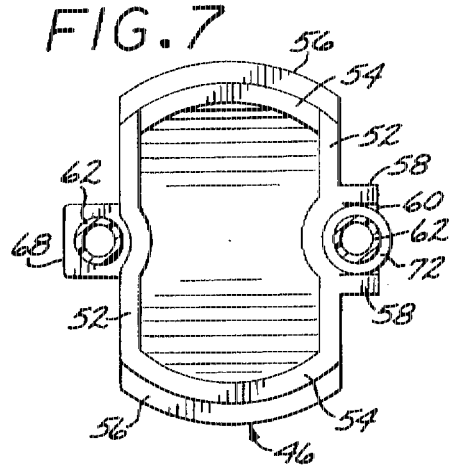
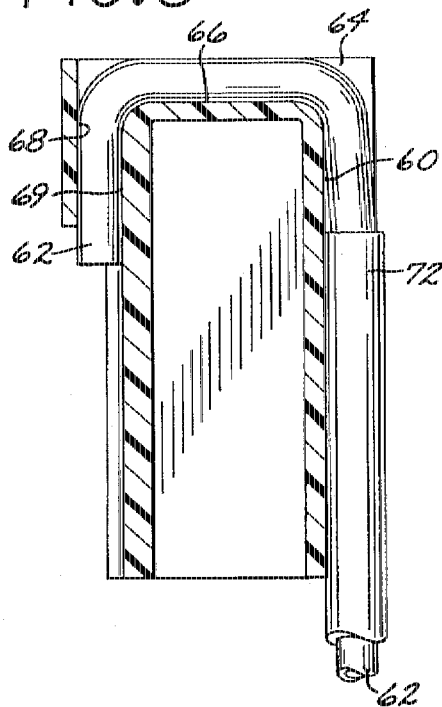
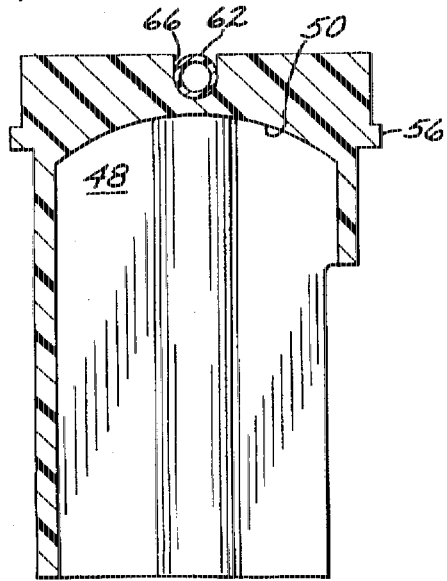

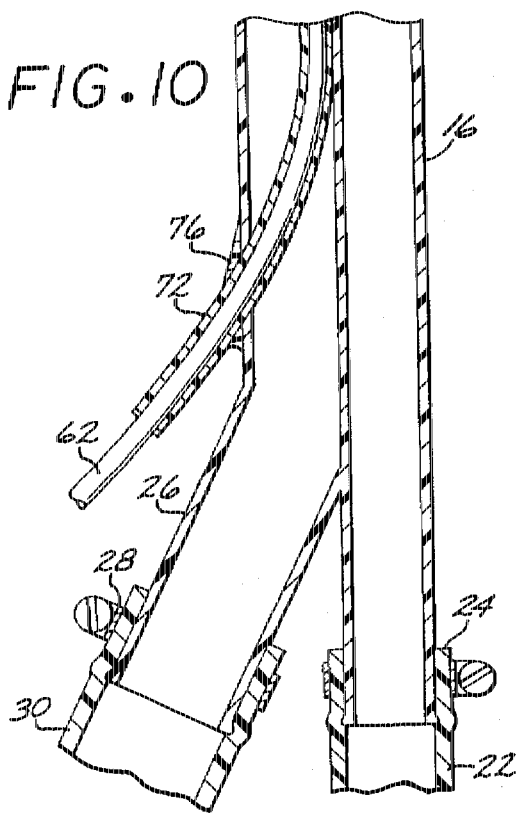
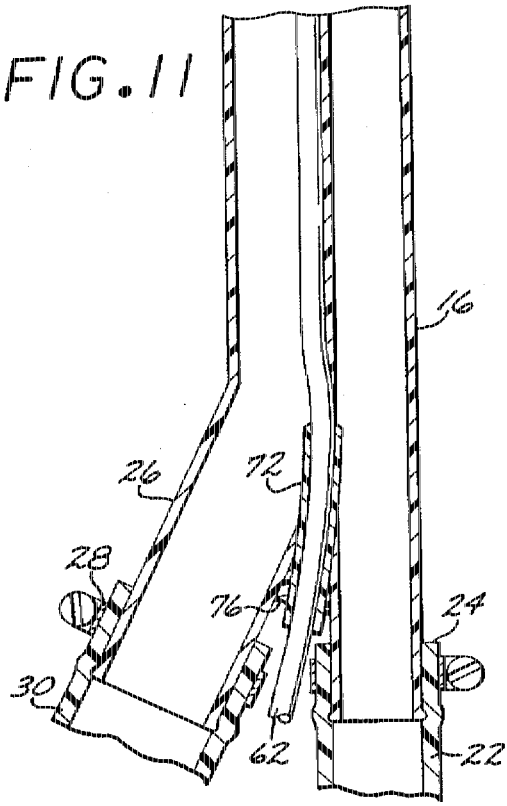
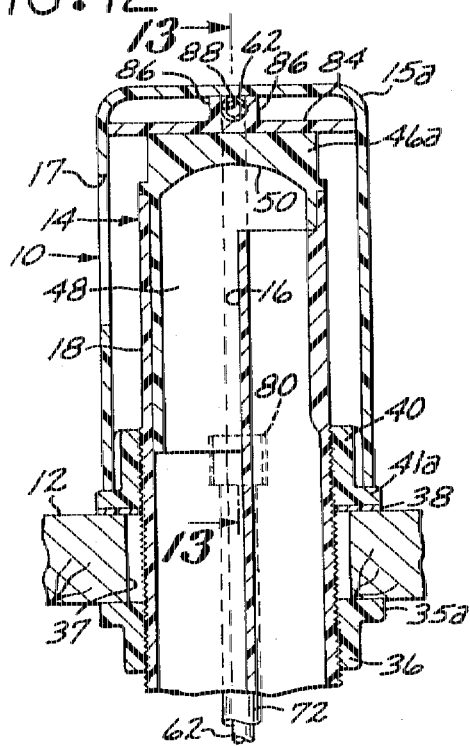
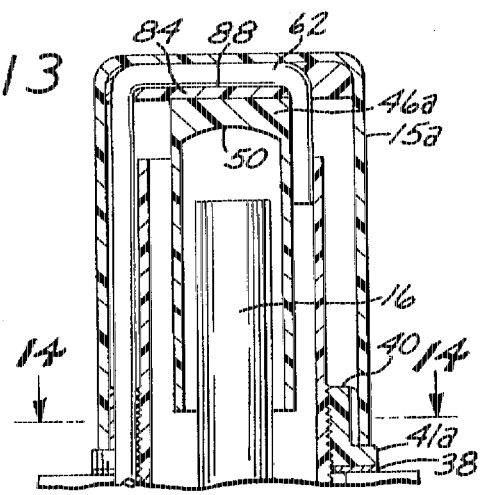
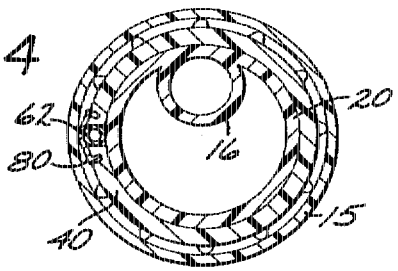

AIR GAP BODY FOR REVERSE OSMOSIS SYSTEM

BACKGROUND OF THE INVENTION

1. Field of the Invention

The present invention relates to a method and apparatus for modifying an air gap body, such as is used with household dishwashers, so that it also vents a reverse osmosis system.

2. Description of the Prior Art

Most plumbing codes specify that an antisiphon or air gap must be located between a household dishwasher outlet hose and the sewage drain line. If a garbage disposer exists, the air gap must be located between the dishwasher outlet hose and the garbage disposer. This prevents development of a vacuum in the lines which could cause drain or waste water to be siphoned back into the dishwasher and into the water supply upstream of the dishwasher.

The body of the typical dishwasher air gap extends above the top of the sink or the kitchen counter next to the sink. It includes one or more air gap openings providing communication between the environment and a chamber within the air gap body through which the dishwasher water flows.

The dishwasher outlet hose is connected to an air gap inlet conduit of the air gap body. This inlet conduit terminates adjacent the vent chamber of the air gap body so that the stream of dishwasher waste water passing through the chamber is vented to atmosphere.

Assuming a householder incorporates a reverse osmosis (RO) unit in the household water system, the stream of waste water from the RO must also be vented to prevent siphoning and contamination of the water supply system connected to the RO system.

It would be inconvenient and unsightly to add a second air gap solely for the RO system since this would require that another hole be drilled or formed in the sink or the countertop. Also, installers prefer not to have to purchase a new air gap unit or take the extra time and effort to install one since this risks splitting or cracking the sink or countertop to drill the necessary installation opening.

An increasing number of RO systems are being installed, usually under the sink, and it is therefore important to provide a quickly and easily installable air gap for both a dishwasher and an RO system, or to provide an air gap retrofit kit that can quickly and easily adapt an existing dishwasher air gap to also vent an RO system.

SUMMARY OF THE INVENTION

According to the present invention, various embodiments are provided for modifying or retrofitting an existing dishwasher air gap body to vent both a dishwasher and an RO system.

A common form of prior art air gap is characterized by a molded, relatively hard plastic main body which is elongated and cylindrical. It includes a bifurcated lower portion comprising a smaller diameter inlet conduit to accept the dishwasher waste water, and a larger diameter outlet conduit that is connected to a discharge hose that carries waste water from the outlet conduit to the sink drain piping, or first to an under sink garbage disposer, if one exists, and then to the sink drain piping.

The smaller inlet conduit extends into a relatively large diameter midportion of the air gap body, and extends upwardly where it terminates adjacent a pair of oppositely located air gap openings in a cylindrical upper portion of the air gap body. The upper portion of this prior art air gap body receives or seats a water reversal module having arcuate end portions that slide within the cylindrical upper portion of the air gap body. Opposite flat sides extend between the arcuate end portions. The flat sides include integrally molded retainer clips that snap fit into the pair of air gap openings in the air gap body to hold the module in place.

This prior art module includes a downwardly open chamber into which water flows upwardly from the smaller inlet conduit. The upper end of the chamber is domed or curved to redirect the upwardly flowing water downwardly. The water then falls into that portion of the larger diameter central portion of the air gap body that is not occupied by the smaller conduit. From there the water flows into the large outlet conduit at the lower end of the air gap body, and next through a soft, relatively compliant rubber discharge hose. The hose empties into a garbage disposer, if there is one, or directly into a sink drain line.

The chamber of the water reversal module is vented to atmosphere by a pair of venting paths defined by the flat sides of the module and the adjacent air gap body. These paths extend across the air gap openings to the air gap body below the chamber.

In one embodiment of the present invention the RO system is vented through the same air gap body that vents the dishwasher. This is done by telescoping the usual small flexible RO waste water drain tube through a larger diameter, relatively stiff carrier sheath. One end of the carrier sheath is cut on a bias to provide a sharpened end. This end is forced into the interior of the discharge hose through an incision made by a sharp pointed instrument or the like.

The sheath is preferably pushed upwardly through the inside of the outlet conduit of the air gap body, and then into the larger diameter central portion of the air gap body. In this embodiment the old prior art water reversing module is discarded, and the upper end of the sheath is received and held within a slot provided in a modified form of water reversing module. The more flexible RO tube is threaded through the stiffer carrier sheath, beyond the end of the sheath in the module slot, over the top of the module, and then downwardly to a point just below one of the air gap openings. A decorative cover over the module holds the sheath and tube in position. If desired, the stiffer sheath can be withdrawn and removed once the RO tube is in position.

In another embodiment of the invention, the dishwasher hose is not pierced. Instead, the outlet conduit of the rigid plastic air gap body is drilled to provide an opening through which the RO tube, either alone or in conjunction with a sheath, is inserted. The tube and sheath are pushed upwardly into the air gap body, just as in the previous embodiment. The margins of the drilled opening preferably are caulked to insure a leakproof connection.

In another embodiment of the invention, the RO waste water tube and protective sheath do not enter the air gap body, but extend on the outside of the body all the way up to the water reversal module. To accomplish this the tube and sheath are held against the outside of the air gap body, and are pushed through the sink or countertop opening with the air gap body. Again, if desired, the sheath could be withdrawn and removed to leave the tube in position.

This external location eliminates any need for piercing the discharge hose. The RO tube is disposed over the module as before, and also over an alignment cap that fits upon the top of the module. A decorative cap fits over this module alignment cap and the upper portion of the air gap body to hold the assembly together.

In yet another embodiment the RO tube and sheath are again located along the outside of the air gap body, but the special module alignment cap is omitted, and the holding and positioning of the RO tube and sheath is accomplished by a special decorative cap that fits over the upper end of the air gap body. If desired, the RO tube need only be loosely deployed around and over the module, with only the downwardly disposed free discharge end being suitably held against movement.

Other objects and features of the present invention will become apparent from the following more detailed description taken in conjunction with the accompanying drawings.

BRIEF DESCRIPTION OF THE DRAWINGS

FIG. 4 is a front elevational view of the water reversal module of the air gap body shown in FIG. 2;

FIG. 5 is a rear elevational view of the module shown in FIG. 4;

FIG. 6 is a top plan view of the module shown in FIG. 5;

FIG. 7 is a bottom plan view of the module shown in FIG. 5;

FIG. 8 is a view taken along the line 8—8 of FIG. 6;

FIG. 9 is a view taken along the line 9—9 of FIG. 6;

FIG. 10 is a vertical cross sectional view of the lower portion of the air gap body of FIG. 2 illustrating a second embodiment of the air gap, in which the RO tubing and sheath are also located internally of the air gap body, but not by piercing the discharge hose, but by insertion through an opening drilled or otherwise formed in the rigid plastic outlet conduit of the air gap body;

FIG. 11 is a vertical cross sectional view of the lower portion of the air gap body of FIG. 2, illustrating a third embodiment similar to the second embodiment except that the RO tubing and sheath are inserted through an opening drilled or otherwise formed at the juncture of the inlet and outlet conduits of the air gap body;

FIG. 12 is an enlarged cross sectional view of yet another embodiment of the present air gap body in which the RO drain tube and associated sheath are located outside of the air gap body, and further illustrating a modified water reversal module having an overlying decorative cap to hold the RO tube and sheath in position;

FIG. 13 is a view of the upper portion of the air gap body taken along the line 13—13 of FIG. 12;

FIG. 14 is a view taken along the line 14—14 of FIG. 13;

DESCRIPTION OF THE PREFERRED EMBODIMENTS

Figure 1:
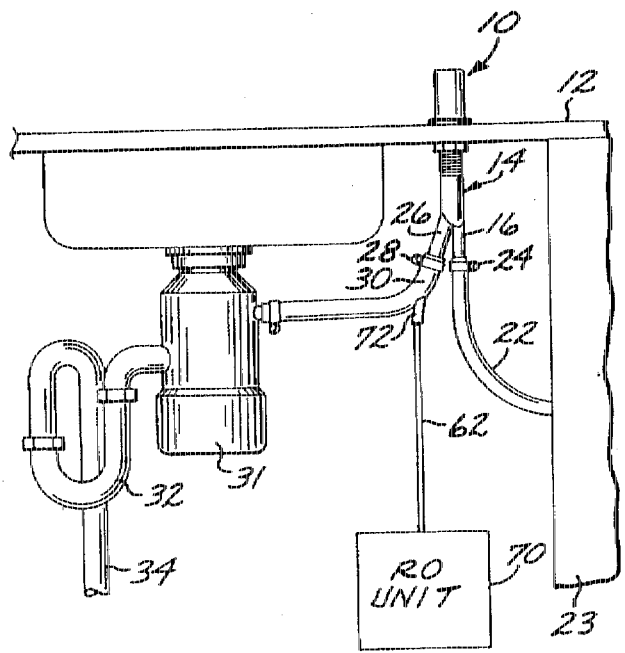
FIG. 1 is a front elevational view of one embodiment of an air gap according to the present invention, as it would be used in combination with a dishwasher and a garbage disposer.

Referring now to the drawings, and particularly to FIGS. 1–9, an air gap 10 is illustrated which includes an air gap body 14 having an open upper end into which a prior art water reversal module 11 is adapted to fit. The prior art module 11 is shown in another embodiment in FIG. 19. It includes a pair of integral legs (not shown) that snap fit into a pair of oppositely located air gap openings 42 to hold the module in position. The prior art module 11 was designed for a single purpose dishwasher application.

In the present embodiment the prior art module 11 is discarded, and a special module 46 is used that is adapted to fit within the same space normally occupied by the prior art module 11.

As will be seen, the module 46 is modified according to the present invention to also serve as an air gap for an RO unit 70.

The air gap body 14 is illustrated as it would appear when mounted to a household kitchen countertop 12. In some instances it would be mounted to the countertop sink. The special module 46 is similar to the prior art module 11, but there are major differences to enable downward discharge of RO waste water through the module 46 by means of an RO waste water tube 62 made of limber or flexible plastic material. The RO waste water is guided by the air gap body into a soft rubber discharge hose 30 leading to a garbage disposer 31, or sink drain line if there is no disposer, for eventual emptying into a drain line 34. The arrangement is effective to vent the discharges from both the dishwasher 23 and a reverse osmosis unit 70.

The air gap body 14 comprises, generally, an elongated, vertically oriented body which is molded of rigid plastic material, and characterized by a relatively large diameter cylindrical and externally threaded midportion 20. Of course, the body 14 need not be cylindrical. It could be virtually any cross section desired. Its upper end is enclosed within a protective chrome cap 15 which includes a vent opening 17 through which the interior of the air gap body 14 can vent to atmosphere.

The large diameter midportion 20 includes a vertically oriented, smaller diameter inlet branch or conduit 16 that is molded integral with the inside surface of the body 14. The conduit 16 extends coextensive with the midportion of the body 14, and out of the bottom of the midportion 20. There it is connected by a clamp 24 to a relatively soft and compliant reinforced rubber outlet hose 22 which is connected to the household dishwasher 23.

That portion of the hollow interior of the body 14 not occupied by the inlet conduit 16 empties into an outlet conduit 26 that is connected by a clamp 28 to the soft rubber discharge hose 30. The hose 30 is connected to the garbage disposer 31 which in turn is connected to a conventional trap 32 that empties into a drain pipe 34. If there were no garbage disposer, the hose 30 would connect directly to the trap 32.

Figure 2:
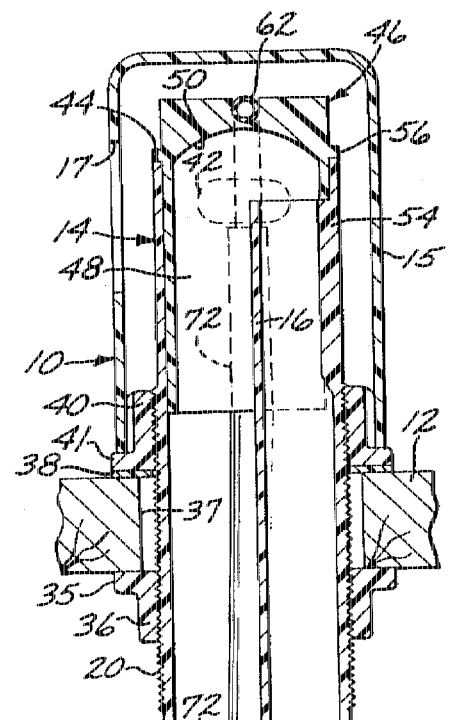
FIG. 2 is an enlarged cross sectional view of the air gap shown in FIG. 1, particularly illustrating the air gap body and its connection to the dishwasher hose, the discharge hose leading to the garbage disposer, and the RO drain tube which pierces the soft rubber discharge hose for internal location within the air gap body.
Figure 3:
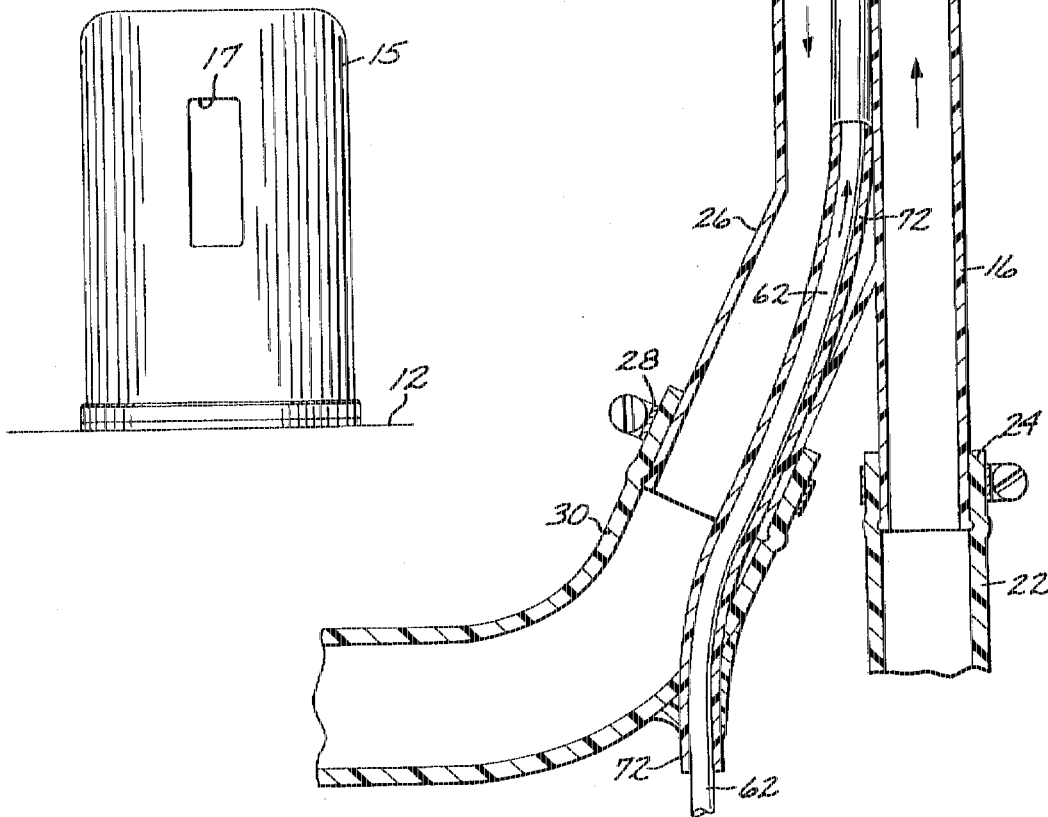
FIG. 3 is a front elevational view of the air gap of FIG. 2, particularly showing the vented decorative cap which is disposed over the projecting upper portion of the air gap body.

With reference to FIG. 2, the prior art procedure for mounting the air gap body 14 to the countertop 12 comprises initially threading a flanged lower fastener or counter nut 36 onto the exterior threads of the body 14. The body 14 is then inserted upwardly through an opening 37 in the countertop 12, the opening being slightly larger than the upper portion of the body 14. With the flange 35 of the nut 36 engaged upon the underside of the countertop, a sealing washer 38 is next placed over the upper portion of the body 14 until it rests upon the upper surface of the countertop 12. A flanged upper nut 40 is then threaded onto the external threads of the body 14 until its flanges 41 rest upon the sealing washer 38. The nuts 36 and 40 are next adjusted and tightened to hold the body 14 at the proper height above the countertop 12.

The major differences between this prior art procedure and module, as compared to the module 46 and the related procedures associated with the module 46 will next be described.

As seen in FIG. 2, the upper edge of the upper portion of the body 14 located above the pair of air gap openings 42 is modified by cutting it away to form a pair of upwardly open seats 44 that are adapted to closely receive opposite flange portions or shoulders 56 of the modified air gap module 46.

With reference to FIGS. 2–9, the walls of the air gap module 46 define a hollow interior or chamber 48 having a bottom open to the air gap body interior, and a domed upper wall 50 against which water from the inlet conduit 16 is directed.

The module 46 includes a pair of oppositely located, generally flat side walls 52 which join with a pair of end walls 54, the walls 52 and 54 extending vertically to merge with the upper wall 50. The sizes of the module flanges 56 and the end walls 52 and 54 are small enough, compared to the module upper end and the module seats 44, that the module 46 is snugly received within the open upper end of the air gap body with the undersides of its flanges 56 resting upon the air gap body seats 44.

The base of one of the end walls 54 of the module 46 is also partially cut away to allow the module 46 to fit over the upper end of the internally located inlet conduit 16.

An inner surface of one of the side walls 52 includes parallel, vertically extending tube walls or rails 58 defining a vertical, laterally open tube slot 60. The slot 60 is sized to snugly hold the reverse osmosis (RO) tube 62 that extends vertically upwardly from the interior of the air gap body 14.

The upper wall of the module 46 includes parallel, horizontally oriented walls or rails 64 which define a horizontal tube slot 66. The slot 66 is sized to snugly hold the horizontal bend portion of the RO tube 62 that extends upwardly from the vertical tube slot 60 against the top of the module 46.

The other side wall 52 of the module 46 includes a vertically elongated, relatively short tube support 68 having a vertical tube opening 69 extending through it, as best seen in FIG. 8. The opening 69 receives the free end of the RO tube 62 that extends from the horizontal tube slot 66, thereby bending the tube 62 downwardly for directing RO waste water downwardly into the interior of the air gap body 14 below the module 46. From there the water flows out the outlet conduit 26.

Location of the RO tube 62 inside the air gap body 14 is facilitated by a special procedure according to the present invention. First, the upper end of a tubular sheath 72, which is made of relatively stiff plastic material, is cut on a bias to provide a pointed end portion. This end is then forcibly inserted into the soft hose 30 through a small opening previously formed by a nail, awl or the like.

After the sheath 72 is inserted, the soft reinforced rubber of the hose 30 resiliently closes upon and clamps the sheath 72 into position in watertight relation. Of course, if the material selected for the tube 62 is itself relatively stiff the sheath can be omitted and the tube 62 pushed into the hose 30. Normally, however, the sheath is inserted into the hose 30, and then pushed up through the interior of the air gap body 14 until it engages the lower ends of the module rails 58. The tube 62 is then threaded through the sheath 72 until it extends up and over the module 46 through the slots 60 and 66, and through the opening 69. If desired, the sheath 72 can be withdrawn from the air gap body, leaving the tube 62 in position. This option is available in any of the embodiments in which the sheath 72 is used as a guide when inserting the tube 62.

Whether the tube 62 is made of flexible or stiff plastic is a matter of choice. It will be apparent that the object is to locate the tube 62 securely in position in a watertight manner. Various combinations of sheath and tube will suggest themselves to those skilled in the art.

Referring now to FIG. 10, another embodiment of the invention is illustrated in which the entry point for the internally located RO tube 62 is changed. Instead of using a sheath inserted through the soft discharge hose 30, an insertion point is made through the relatively hard plastic of the air gap body 14 just above the outlet conduit 26, as by drilling a hole in the plastic and inserting the sheath 72 and tube 62 through the hole. If desired, sealant material 76 can be packed around the sheath at its point of entry, as illustrated, to insure there is no leakage. Usually this is not necessary because the interior pressure of the body 14 is close to ambient.

FIG. 11 illustrates another entry point for the RO tube 62. In this case the sheath 72 is inserted through a drilled hole located at the juncture of the air gap body conduits 26 and 16. As previously indicated, the area around the sheath 72 can be packed or caulked with suitable material to insure against leakage if desired. FIG. 11 also illustrates use of a tube 62 made of relatively stiff plastic material so that the sheath 72 can be shortened to span only the insertion area. It need not extend up to the module 46 since the stiffer tube 62 can be pushed upwardly without depending upon the sheath 72 to resist bending.

Another variation would be to insert the tube 62 and/or the sheath 72 through a drilled hole provided in the inlet conduit, and extend the tube 62 and/or the sheath 72 upwardly. Suitable spaced apart holes (not shown) could be provided in the top of the module so that a flexible tube 62 could be disposed through one of the holes, looped over the module, and deployed downwardly through the other hole for discharge into the air gap body below the module.

In the description which follows, identical numerals are employed where the components are identical to those of the embodiments of FIG. 2. Identical numerals with a lower case "a" are used where the components are similar but not identical. New numerals are used where the components are substantially different.

Referring now to FIGS. 12–14, and 16–18, an embodiment is illustrated in which the RO tube 62 is located outside the air gap body 14, eliminating any need to pierce either the discharge hose 30 or the air gap body 14. Instead, the tube 62 passes from the RO unit 70 directly up and through the lower counter nut 36a that mounts the air gap body to the underside of the countertop 12.

Figure 17:
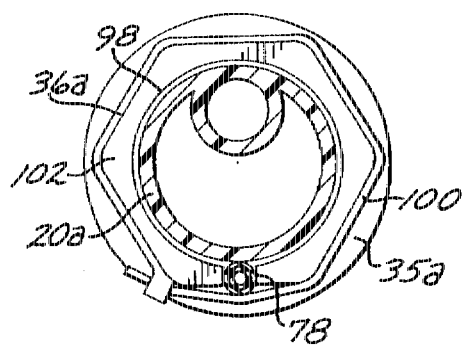
FIG. 17 is an enlarged top plan view of the lower counter nut, the nut being split to transversely fit upon the threaded midportion of the air gap body, a circumferentially disposed cable tie being shown to illustrate how the nut threads are maintained in close engagement with the air gap body threads.
Figure 18:
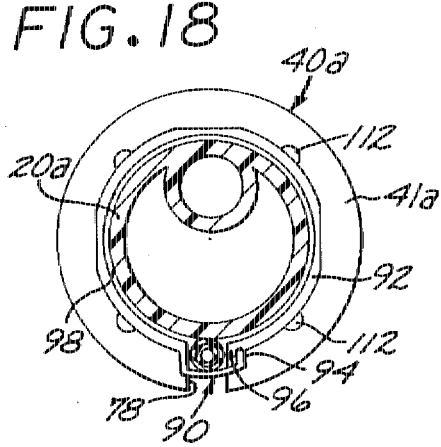
FIG. 18 is an enlarged top plan view of an upper nut adapted to fit against the upper side of a kitchen countertop, the nut being split to transversely fit upon the threaded midportion of the air gap body, where it is held by a clip that is integrally molded as a part of the nut.

The tube 62 and the sheath 72a which encloses it extend upwardly through slots 78 provided in the flanges 35a and 41a of the clamp nuts 36a and 40a, respectively, as best seen in FIGS. 17 and 18. These slots split each nut, and enable the somewhat flexible material of the nut to be flexed and spread apart at the slot to enable the nut to be laterally mounted upon the threaded midportion 20 of the air gap body.

Figure 16:
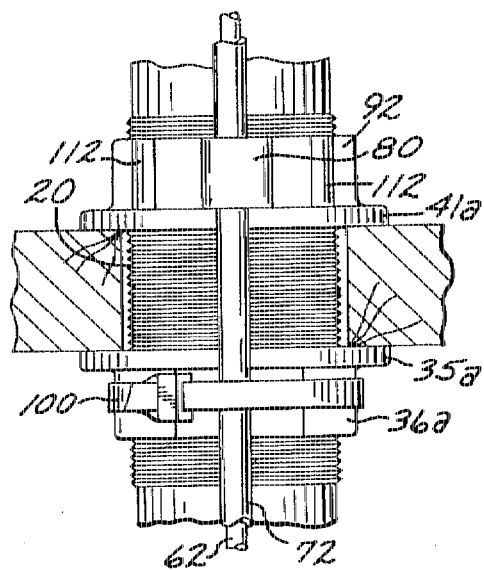
FIG. 16 is a partial front elevational view of the midportion of the air gap body, illustrating the relative location of the upper and lower counter nuts, the sheath and RO tube, and also the holding clip in the upper nut.

The sheath 72a and enclosed tube 62 can be securely held within the slot 78 of upper nut 40a by an overlying C-shape clip 80 which is seated within suitable slits cut in the flange 41a, as seen in FIGS. 12, 14 and 16.

Preferably, a flexible link 90 is molded as part of a vertical nut portion 92 of the upper nut 41a. The free end of the link 90, as seen in FIG. 18, includes a prong or hook 94 which fits snugly against a radially outwardly projecting shoulder 96 of the nut portion 92. This holds the split portions of the nut 40a together so that they clamp onto the threads 98 of the body midportion 20.

The sheath 72a is clamped within the slot 78 of the lower nut 36a by a usual and conventional nylon cable tie 100 which tightly encircles and clamps against the vertical nut portion 102 of the nut 36a to hold the split portions of the nut together.

The clip 80, prong 94 and cable tie 100 are merely exemplary of devices that can be used to clamp the nuts 36a and 40a in place. Various other suitable clamping means will suggest themselves to those skilled in the art.

Figure 15:
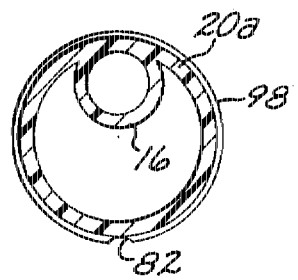
FIG. 15 is a transverse cross sectional view taken through the threaded midportion of a modified form of air gap body, illustrating the groove cut or molded in the air gap body to make room for the RO tube and sheath.

Additional clearance may be provided to insure passage of the sheath 72a through the countertop opening 37, as seen in FIG. 15. A vertical recess or slot 82 can be molded or cut through the threads 98 of the body midportion 20a to provide more room for the sheath 72 to rest in the slot in recessed position to more easily fit through the countertop opening 37.

In the embodiment of FIGS. 12–14, the tube 62 is also located outside of the air gap midportion 20, except that the tube does not fit within a horizontal tube slot in the top of the water reversal module. Instead, a special circular cap 84 is seated on top of the module 46a to vertically receive the tube 62 on one side, and redirect it downwardly on the other side.

The cap 84 includes a pair of horizontally oriented walls or rails 86 that define a tube slot or passage 88. Vertical holes are drilled or otherwise formed in the cap 84 at each end of the passage 88 to receive the upwardly oriented portion of the tube 62, and a downwardly directed portion of the tube 62, respectively.

The sheath 72 is made long enough to terminate just below the cap 84. The tube 62 inside the sheath 72 is then pushed upwardly through the sheath 72, and through the adjacent hole in the cap. The upwardly oriented tube 62 is next bent and directed horizontally through the tube slot 88, and then is curved downwardly to pass through the other cap hole. From there the tube 62 extends downwardly into the vertical tube passage 69 of the module 46, as seen in FIG. 8.

The cap diameter is slightly less than the diameter of the decorative cap 15a so that the interior surface of the decorative cap 15a frictionally engages the perimeter of the cap 84, and pushes it downwardly to hold it in position.

With this arrangement RO waste water can drop from the free end of the tube 62 into the air gap body 14a, where it then passes out of the outlet tube 26. The arrangement completely eliminates piercing of the hose 30, or drilling of the air gap body 14.

The sequence of installation of the air gap 14 within the countertop opening 37 can best be visualized from an examination of FIGS. 2, 12 and 16. In the case of an externally located sheath 72 and tube 62, the installer first checks to see if the countertop opening 37 is large enough to allow the sheath 72 to slide through. If not, the slotted body midportion 20 is preferably used to carry the sheath 72 in recessed relation or, of course, the opening 37 is simply made larger.

If a commercially available air gap body has been purchased for retrofitting to accept the RO module 46 or 46a of the present invention, the existing upper and lower countertop engaging nuts are preferably unthreaded and discarded.

The split upper and lower nuts 40 (or 40a) and 36 (or 36a) are transversely mounted on the threaded midportion 20 of the air gap body, and the sheath 72 and tube 62 thereafter disposed and held in place as described above.

From the foregoing it is seen that the present invention provides an easy means for quickly and easily modifying a prior art dishwasher air gap by replacing its water reversing module with a special module according to the invention, and by introducing the RO waste water tube into the air gap body in a manner such that the modified air gap accommodates both a dish washing machine and a reverse osmosis unit.

Figure 19:
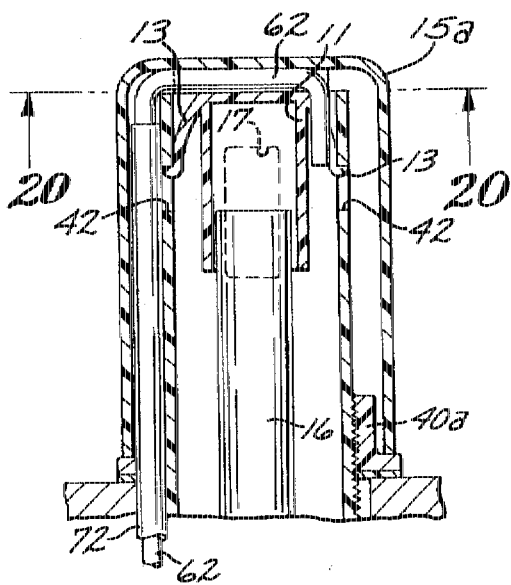
FIG. 19 is a partial longitudinal cross sectional view of yet another embodiment of the invention in which the RO drain tube and associated sheath are disposed externally of the air gap body, the embodiment being adapted to use a prior art water reversal module in combination with a modified decorative cap incorporating structure to properly locate and direct the tube and sheath.
Figure 20:
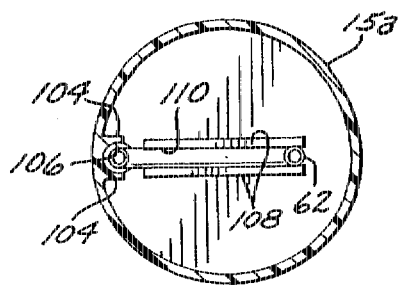
FIG. 20 is a bottom plan view of the decorative cap of FIG. 19.

An even more simplified embodiment of the invention is illustrated in FIGS. 19 and 20. In this version the prior art module 11 can be used, and the tube 62, alone or in combination with the sheath 72, is deployed outside the air gap body, as seen in the embodiment of FIG. 12, for example.

A modified decorative cap 15a is employed in place of the decorative cap (not shown) that was originally installed, or that was furnished with a prior art replacement air gap body assembly.

The modified cap 15a includes, as seen in FIGS. 19 and 20, a pair of parallel, vertically oriented walls or rails 104 that are molded integrally with the inner surface of one side of the cap 15a to define a tube slot 106. Similar horizontally oriented walls or rails 108 are molded in the inner surface of the upper wall of the cap 15a to define a tube slot 110.

The sheath 72 is preferably pushed upwardly to the point where it engages the base of the tube slot 106. The tube 62 is then pulled upwardly out of the sheath 72 to snugly seat within the slot 106. From there the tube is horizontally extended to snugly fit within the horizontal slot 110, with the free end of the tube 62 allowed to extend downwardly.

The tube 62, with or without the sheath 72, can easily pass downwardly through the spaces defined between the inner curved surface of the upper end of the air gap body, and one of the flat side walls of the prior art water reversal module 11. The shape and location of these walls is like the flat side walls 52 of the module 46 illustrated in FIG. 7.

The lower end of the downwardly directed portion of the tube 62 empties into the air gap body in a manner similar to that described in connection with the embodiment of FIG. 2.

The decorative cap 15a is securely held in position by engagement with nodes or protuberances 112 which are molded as part of the upper counter nut 40a, as seen in FIG. 12. The cap 15a is preferably dimensioned so that in its position engaged upon the protuberances 112, the underside of the cap 15a will hold the tube 62 in its operative position.

From the foregoing it will be seen that a relatively rapid retrofit can be accomplished accordingly to the present invention to enable venting of both a dishwasher or the like and a newly added RO system.

The RO tube 62 can be disposed through the inside of the air gap body by piercing the conduit 26 or conduit 16 or discharge hose 30 and then deploying the tube 62 upwardly to the module. Alternatively, the tube 62 can be upwardly disposed outside the air gap body and through the existing sink or countertop opening provided for the dishwasher air gap body, and then extended upwardly on the outside of the module.

Either way provides quick and easy access to the module area without having to dismantle any of the existing plumbing.

The tube 62 is then deployed to a position above the module, and then reversely formed for discharge into the discharge portion of the air gap body space below the module for venting.

Desirably, the downwardly disposed free end of the tube 62 is held in position by suitable means so that the RO waste water discharge is reliably directed into the air gap body.

Various forms of module have been illustrated, together with various orientations of the internal or external RO tube relative to these forms of module. It is contemplated by the present invention that the concepts disclosed can be associated with other forms of module as well.

It will be appreciated that whatever air gap body or module is used, the RO tube 62 will be deployed into the region above the module, and then reversely formed and disposed downwardly through suitable spaces, passages or holes, either existing or formed for the purpose, that enable the RO tube to discharge into the discharge portion of the air gap body for venting and emptying into the drain system. Providing a pair of vertically directed spaced apart openings to receive the tube 62, as seen in the cap 84 of FIG. 12, is a particularly reliable means for anchoring the tube in position.

Use of a highly flexible, relatively small diameter tubing for the RO tube facilitates various orientations of the RO tube in the confined spaces in and around the module.

While several forms of the invention have been illustrated and described, it will be apparent that various modifications and changes can be made without departing from the spirit and scope of the invention.

What is claimed is:

1. An air gap comprising:
    an air gap body which includes a hollow, upwardly open upper portion, and a lower portion having an inlet conduit for receiving waste water from a first source, and an outlet conduit for discharging waste water;
    a water reversal module received within the upper portion of the air gap body, and including first air gap means providing communication between the atmosphere and the hollow interior of the air gap body leading to the outlet conduit, and further including means for redirecting the waste water from the inlet conduit downwardly through the hollow air gap body and into the outlet conduit;
    an RO tube for receiving reverse osmosis waste water; and
    support means for supporting and guiding the RO tube upwardly for location adjacent the module, and then downwardly for discharge of the reverse osmosis waste water into the hollow interior of the air gap body for discharge out of the outlet conduit.

2. An air gap body according to claim 1 wherein the support means includes tube receiving support means on the sides of the module, and tube receiving support means on the top of the module, and wherein the RO tube extends upwardly for support by at least one of the tube receiving support means for downward discharge of the reverse osmosis waste water through the hollow interior of the air gap body and into the outlet conduit.

3. An air gap body according to claim 1 and including a decorative cap overlying the module and having second air gap opening means providing communication between atmosphere and the hollow interior of the air gap body leading to the outlet conduit, and wherein the support means includes tube receiving support means on the interior of the decorative cap for receiving the upwardly extending RO tube and directing the RO tube downwardly for emptying the reverse osmosis waste water into the hollow interior of the air gap body for discharge out of the outlet conduit.

4. An air gap body according to claim 1 and including an overlying cap engaged upon the module, and wherein the support means includes a first tube receiving opening in the overlying cap, and a second tube receiving opening in the overlying cap, and wherein the RO tube extends upwardly through the first tube receiving opening, and then downwardly through the second tube receiving opening for emptying of the reverse osmosis waste water into the hollow interior of the air gap body for discharge out of the outlet conduit.

5. An air gap body according to claim 1 wherein the RO tube extends upwardly through the hollow interior of the air gap body.

6. An air gap body according to claim 5 and including a compliant discharge hose which is sufficiently soft and resilient that it can be pierced by a sharp instrument, the discharge hose being connected to the outlet conduit of the air gap body for emptying into a waste water drainage system, the RO tube extending into the outlet conduit through a pierced opening in the discharge hose.

7. An air gap body according to claim 6 and including a tubular sheath internally receiving and protecting the RO tube, and wherein the sheath extends through the pierced opening such that the resilience of the hose causes the hose to tightly hold the RO tube in fluid tight relation.

8. An air gap body according to claim 7 wherein the sheath extends upwardly through the hollow interior of the air gap body and terminates adjacent the module.

9. An air gap body according to claim 5 wherein the air gap body is made of relatively rigid plastic material having a formed opening, the RO tube extending into the hollow interior of the air gap body through the opening, and the inlet conduit and outlet conduit having a juncture between them.

10. An air gap body according to claim 9 and including a tubular sheath internally receiving and protecting the RO tube, and wherein the sheath extends into the hollow interior of the air gap body through the opening.

11. An air gap body according to claim 9 wherein the opening is drilled into the air gap body just above the outlet conduit.

12. An air gap body according to claim 9 wherein the opening is drilled into the air gap body adjacent the juncture of the outlet conduit and the inlet conduit.

13. An air gap comprising:
- an air gap body which includes a hollow, upwardly open upper portion, a threaded middle portion for positioning within an opening provided in a mounting structure having an upper side and a lower side, the air gap body further including a lower portion having an inlet conduit for receiving waste water from a first source, and an outlet conduit for discharging waste water;
- a counter nut for threaded engagement with the threaded middle portion and the lower side of the mounting structure;
- a water reversal module received within the upper portion of the air gap body, and including first air gap means providing communication between the atmosphere and the hollow interior of the air gap body leading to the outlet conduit;
- an RO tube for receiving reverse osmosis waste water; and
- support means for supporting and guiding the RO tube upwardly for location adjacent the module, and then downwardly for discharge of the reverse osmosis waste water into the hollow interior of the air gap body for discharge out of the outlet conduit, and wherein the RO tube extends upwardly externally of the air gap body and through the opening in the mounting structure.

14. An air gap body according to claim 13 wherein the threaded middle portion of the air gap body includes a vertically extending groove for receiving the RO tube in substantially recessed relation for easier passage through the opening in the mounting structure.

15. An air gap body according to claim 14 wherein the counter nut includes a slot and is made of resilient material enabling the slot to be sprung apart sufficiently to permit the nut to be transversely seated upon the threaded middle portion of the air gap body, and wherein the RO tube extends through the slot in the nut.

16. An air gap body according to claim 15 wherein the nut is encircled by a clamping means for urging the nut into threaded engagement with the threaded middle portion of the air gap body.

17. An air gap body according to claim 16 wherein the clamping means is a tie member.

18. An air gap body according to claim 16 wherein the counter nut is made of plastic material, and the clamping means for the counter nut comprises a hook and recess integrally molded into the plastic material of the counter nut, and interengageable for urging the nut into the threaded engagement.

19. An air gap body according to claim 13 wherein the RO tube extends upwardly externally of the module, and including a decorative cap overlying the module and having air gap means providing communication between atmosphere and the hollow interior of the air gap body leading to the outlet conduit, and wherein the support means includes a tube receiving support means on the interior of the decorative cap for receiving the upwardly extending RO tube and directing the RO tube downwardly for emptying the reverse osmosis waste water into the hollow interior of the air gap body for discharge out of the outlet conduit.

20. An air gap body according to claim 13 wherein the support means includes tube receiving support means on the sides of the module, and tube receiving support means on the top of the module, and wherein the RO tube extends externally of the air gap body and the module for support by at least one of the tube receiving support means for downward discharge of the reverse osmosis waste water into the hollow interior of the air gap body for discharge out of the outlet conduit.

21. An air gap comprising:
- an air gap body which includes a hollow upper portion, and a lower portion having an inlet conduit for receiving waste water from a first source, and an outlet conduit for discharging waste water;
- water reversal means mounted to the upper portion of the air gap body, and including air gap means providing communication between the atmosphere and the hollow interior of the air gap body leading to the outlet conduit;
- RO waste discharge means for receiving reverse osmosis waste water, the RO waste discharge means including an upwardly directed flexible tubular first conduit portion extending externally of the water reversal means, a downwardly directed flexible tubular second conduit portion oriented for discharge of the reverse osmosis waste water into the hollow interior of the air gap body for discharge out of the outlet conduit, and intermediate means providing fluid communication between the flexible tubular first conduit portion and the flexible tubular second conduit portion; and
- a decorative cap overlying the module and enclosing and containing the intermediate means.

* * * * *